(12) United States Patent
Sacks et al.

(10) Patent No.: US 6,879,458 B2
(45) Date of Patent: Apr. 12, 2005

(54) METHOD FOR THERMALLY WRITING SERVO PATTERNS ON MAGNETIC MEDIA

(75) Inventors: Alexei H. Sacks, Edina, MN (US); Li-Ping Wang, Fremont, CA (US); Donald E. Curtiss, Los Gatos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 231 days.

(21) Appl. No.: 10/304,924

(22) Filed: Nov. 26, 2002

(65) Prior Publication Data

US 2003/0076612 A1 Apr. 24, 2003

Related U.S. Application Data

(62) Division of application No. 09/425,768, filed on Oct. 22, 1999, now Pat. No. 6,490,117.
(60) Provisional application No. 60/126,386, filed on Mar. 26, 1999.

(51) Int. Cl.$^7$ .............................................. G11B 21/02
(52) U.S. Cl. ....................................................... 360/75
(58) Field of Search .................. 360/75, 59; 369/13.02, 369/13, 59

(56) References Cited

U.S. PATENT DOCUMENTS

| | | | |
|---|---|---|---|
| 3,176,278 A | 3/1965 | Mayer | 360/59 |
| 3,368,209 A | 2/1968 | McGlauchlin et al. | 360/59 |
| 3,512,170 A | 5/1970 | Nelson | 346/74.4 |
| 3,611,420 A | 10/1971 | Benoit | 346/74.4 |
| 3,612,759 A | 10/1971 | Nelson et al. | 386/42 |
| 3,939,302 A | 2/1976 | Kihara | 178/6.6 R |
| 4,428,069 A | 1/1984 | Hazel et al. | 365/215 |
| 4,466,004 A | 8/1984 | Kobayashi et al. | 346/74.4 |
| 4,679,103 A | 7/1987 | Workman | 360/77 |
| 4,833,662 A | 5/1989 | Yoda | 369/13 |
| 4,935,835 A | 6/1990 | Godwin et al. | 360/135 |
| 4,954,907 A | 9/1990 | Takita | 360/78.07 |
| 5,089,757 A | 2/1992 | Wilson | 318/560 |
| 5,117,408 A | 5/1992 | Weispfenning et al. | 369/32 |
| 5,120,927 A | 6/1992 | Williams et al. | 219/121.68 |
| 5,136,439 A | 8/1992 | Weispfenning et al. | 360/77.08 |
| 5,193,034 A | 3/1993 | Tsuyoshi et al. | 360/51 |
| 5,210,672 A | 5/1993 | Ivers et al. | 360/135 |

(Continued)

FOREIGN PATENT DOCUMENTS

| | | |
|---|---|---|
| EP | 0 266 833 A1 | 10/1987 |
| EP | 0 262 690 | 4/1988 |
| EP | 0 437 947 A2 | 12/1990 |
| EP | 0 420 439 | 4/1991 |
| EP | 0 789 704 | 3/1997 |
| JP | 62-043816 | 2/1987 |
| JP | 62-159352 | 7/1987 |
| JP | 62-192025 | 8/1987 |
| WO | WO 97/28529 | 8/1997 |
| WO | WO 99/30318 | 6/1999 |

*Primary Examiner*—Sinh Tran
*Assistant Examiner*—Mitchell Slavitt
(74) *Attorney, Agent, or Firm*—Westman, Champlin & Kelly

(57) ABSTRACT

A method for thermally writing a magnetic servo pattern on a magnetic disc medium prior to assembling the medium in a disc drive is provided in which the medium is first magnetized in a uniform magnetization direction. A plurality of magnetic domains are then thermally written on the medium, one magnetic domain at a time, by individually heating each magnetic domain with a light beam while exposing the magnetic domain to a magnetic field. The magnetic field has an orientation that is opposite to the uniform magnetization direction. The light beam forms an illumination pattern on the medium having a shape that at least partially defines a boundary of each magnetic domain.

19 Claims, 6 Drawing Sheets

U.S. PATENT DOCUMENTS

| | | | |
|---|---|---|---|
| 5,262,907 A | 11/1993 | Duffy et al. | 360/77.05 |
| 5,295,122 A | 3/1994 | Murakami et al. | 369/13.17 |
| 5,345,342 A | 9/1994 | Abbott et al. | 360/48 |
| 5,450,381 A | 9/1995 | Tsukamura et al. | 369/13 |
| 5,462,823 A | 10/1995 | Evans et al. | 430/14 |
| 5,546,364 A | 8/1996 | Fuji et al. | 369/13 |
| 5,576,906 A | 11/1996 | Fisher et al. | 360/77.08 |
| 5,583,727 A | 12/1996 | Parkin | 360/113 |
| 5,585,989 A | 12/1996 | Kuromiya et al. | 360/135 |
| 5,602,692 A | 2/1997 | Freitas et al. | 360/77.08 |
| 5,619,480 A | 4/1997 | Seo et al. | 369/14 |
| 5,629,909 A | 5/1997 | Shiratori | 369/13 |
| 5,825,579 A | 10/1998 | Cheung et al. | 360/77.08 |
| 5,841,520 A | 11/1998 | Taniguchi | 355/53 |
| 5,867,341 A | 2/1999 | Volz et al. | 360/77.08 |
| 5,889,641 A | 3/1999 | Belser et al. | 360/313 |
| 5,894,463 A | 4/1999 | Okawa et al. | 396/44.35 |
| 5,966,348 A | 10/1999 | Hashimoto et al. | 369/13 |
| 5,987,562 A | 11/1999 | Glover | 711/4 |
| 6,014,296 A | 1/2000 | Ichihara et al. | 360/135 |
| 6,055,139 A | 4/2000 | Ohtsuka et al. | 360/131 |
| 6,602,620 B1 * | 8/2003 | Kikitsu et al. | 428/694 T |

* cited by examiner

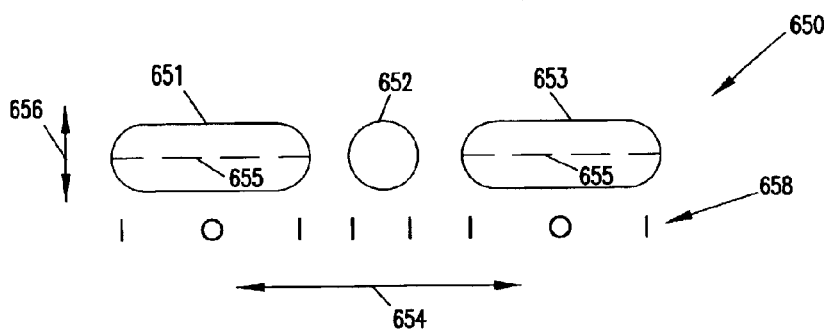
FIG. 11
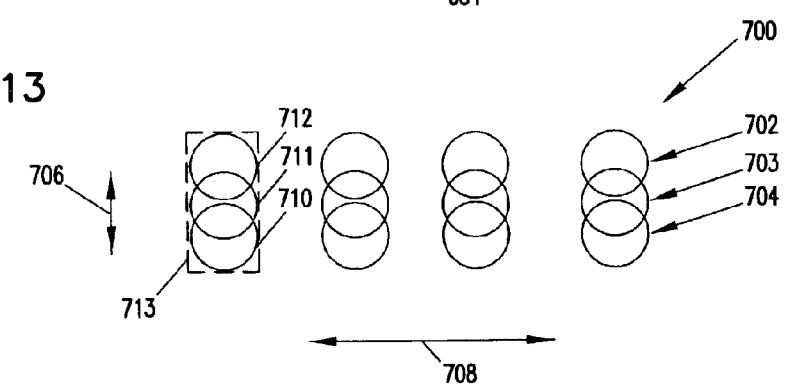
FIG. 13
FIG. 4
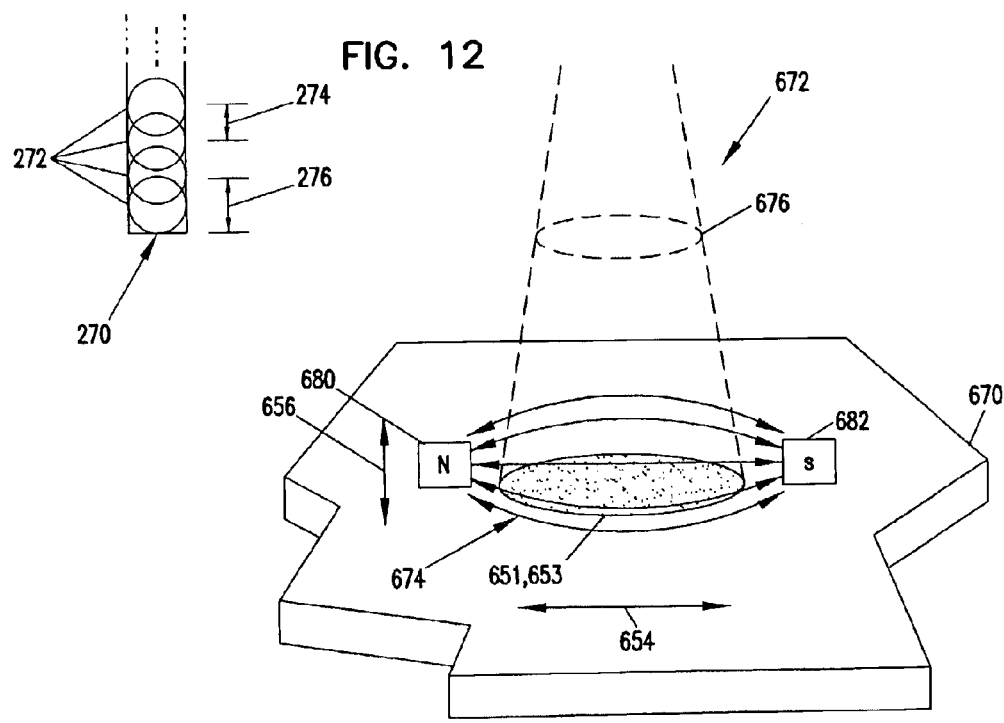
FIG. 12

METHOD FOR THERMALLY WRITING SERVO PATTERNS ON MAGNETIC MEDIA

CROSS-REFERENCE TO RELATED APPLICATIONS

This application is a divisional of U.S. application Ser. No. 09/425,768, which was filed on Oct. 22, 1999, is issuing as U.S. Pat. No. 6,490,117 and claims the benefit of U.S. Provisional Patent Application No. 60/126,386, which is entitled "METHOD OF THERMALLY PRINTING SERVO PATTERNS ON MAGNETIC MEDIA" and was filed on Mar. 26, 1999.

Cross-reference is made to U.S. Ser. No. 09/425,576, filed on Oct. 22, 1999 and entitled "METHOD AND APPARATUS FOR ENCODING IDENTIFICATION INFORMATION ON A MAGNETIC DISC, to U.S. Ser. No. 09/209,902, filed on Dec. 11, 1998 and entitled "PHOTO SERVO PATTERNING ON MAGNETO-OPTICAL MEDIA" and to U.S. Ser. No. 09/130,657, filed Aug. 7, 1998 and entitled "HARD DISC PATTERNING", which are assigned to the same Assignee.

BACKGROUND OF THE INVENTION

The present invention relates to data storage devices and, in particular, to writing servo patterns on magnetic media.

In a magnetic disc drive, data is stored on one or more discs, which are coated with a magnetic medium. The magnetic medium is typically divided into a plurality of generally parallel data tracks, which are arranged concentrically with one another perpendicular to the disc radius.

The data is stored and retrieved by a transducer or "head" that is positioned over a desired track by an actuator arm. The actuator arm moves the head in a radial direction across the data tracks under control of a closed-loop servo system based on position information or "servo data", which is stored within dedicated servo fields. The servo fields can be interleaved with data sectors on the disc surface or can be located on a separate disc surface that is dedicated to storing servo information. As the head passes over the servo fields, it generates a readback signal that identifies the location of the head relative to the center line of the desired track. Based on this location, the servo system moves the actuator arm to adjust the head's position so that it moves toward a desired position.

The servo field patterns are typically written onto the disc surface through the product read/write head after the disc has been assembled within the disc drive housing to form a head disc assembly (HDA). A machine called a Servo Track Writer (STW) clamps the HDA along the X, Y and Z axes and then through some method, measures the position of the read/write head and positions the head to the appropriate radial locations to write the servo tracks. Typical methods of obtaining position feedback include the use of a laser interferometer or an optical encoder.

The Servo Track Writer also provides a clock signal with which to align adjacent servo tracks in time. Typically, a clock head is inserted into the HDA and is flown on one of the disc surfaces. The clock head is used to write a clock signal on to the disc surface. This clock signal is then used to run a phase locked loop (PLL) for obtaining a stable reference signal with which to write adjacent radial tracks in a servo pattern with sufficient radial coherence.

There are many advantages to writing the servo tracks in the HDA, after the HDA has been assembled. Unfortunately, the accuracy of the servo tracks (i.e., the actual placement of the tracks on the disc surface) is not optimal when writing the servo tracks in the HDA. Any non-repeatable run-out (NRRO) the HDA at the time of servo writing will be written into the servo pattern. In self-servo track writer systems, the servo tracks are written by bootstrapping the position of each track by the position of the previous track in the HDA with no external references. In these systems, errors in the placement of the servo tracks tend to propagate radially from one track to the next as each track is written in the HDA. Another difficulty encountered when writing the servo tracks is that the accuracy of the servo patterns must increase with decreased track-to-track spacing as the storage density of disc drives continues to increase.

The present invention addresses these and other problems, and offers other advantages over the prior art.

SUMMARY OF THE INVENTION

One aspect of the present invention relates to a method of thermally writing a magnetic servo pattern on a magnetic disc medium prior to assembling the medium in a disc drive, wherein the medium has a generally circumferential track. The method includes magnetizing the medium in a uniform magnetization direction and then thermally writing a plurality of magnetic domains on the medium, one magnetic domain at a time. Each magnetic domain is individually heated with a light beam while exposing the magnetic domain to a first magnetic field having an orientation that is opposite to the uniform magnetization direction. The light beam forms an illumination pattern on the medium having a shape that at least partially defines a boundary of each magnetic domain. The illumination pattern shape is selectively varied from at least one of the plurality of magnetic domains to the next within the track while writing the magnetic domains that form the servo pattern.

Another aspect of the present invention relates to a method of thermally encoding an information pattern along a track of a magnetic disc medium. The method includes exposing the magnetic disc medium to a magnetic field having a magnetic field strength that is less than a magnetic coercivity of the medium at an ambient temperature and greater than the magnetic coercivity at an elevated temperature. A plurality of magnetic domains are thermally written on the medium by individually heating each magnetic domain to the elevated temperature with a light beam while exposing the magnetic disc medium to the magnetic field. A cross-sectional shape of the light beam at least partially defines a boundary of each magnetic domain and is selectively varied from at least one of the plurality of magnetic domains to the next while thermally writing the plurality of magnetic domains within the track.

Yet another aspect of the present invention relates to a method of thermally encoding an information pattern along a track of a magnetic medium. The method includes magnetizing the medium in a uniform magnetization direction and then thermally writing a plurality of magnetic domains within the track, one magnetic domain at a time. Each magnetic domain is individually heated with a light beam while exposing the magnetic domain to a first magnetic field having an orientation that is opposite to the uniform magnetization direction. The light beam forms an illumination pattern on the medium having a shape that at least partially defines a boundary of each magnetic domain and is substantially square.

BRIEF DESCRIPTION OF THE DRAWINGS

FIG. 4 is a diagram illustrating an elongated magnetic domain formed by overlapping individual magnetic domains.

FIG. 11 illustrates a pulse train having a plurality of thermally written elliptical magnetic domains having a major axis aligned in a down-track direction.

FIG. 12 is a perspective, fragmentary view of a light beam illuminating an individual magnetic domain on a disc surface in the presence of an external magnetic field.

FIG. 13 shows a pulse train having first, second and third sets of overlapping thermally written magnetic domains.

DETAILED DESCRIPTION OF THE PREFERRED EMBODIMENTS

Figure 1:
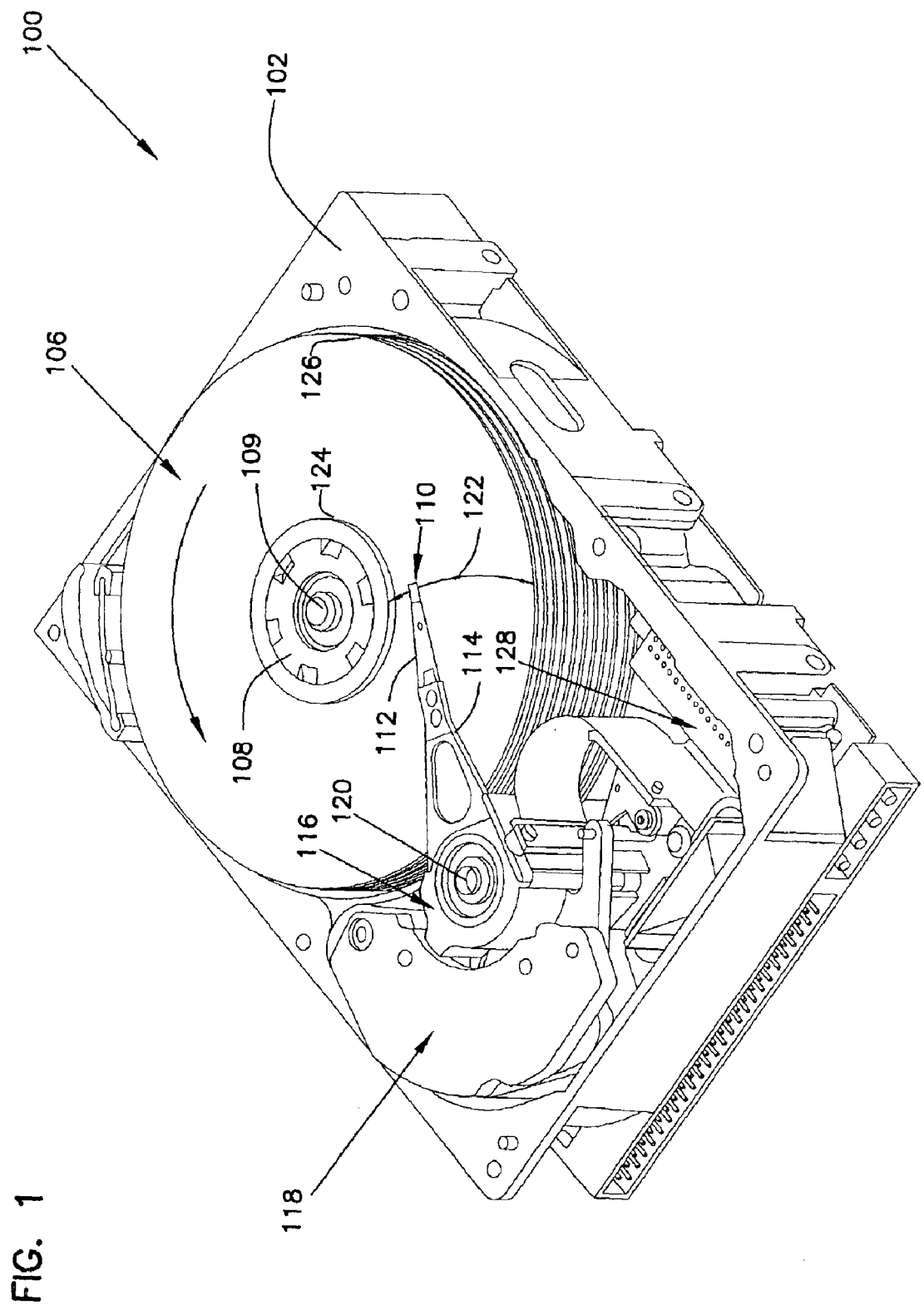
FIG. 1 is a perspective view of a head disc assembly (HDA) with which the present invention is useful.

FIG. 1 is a perspective view of a magnetic disc drive, head disc assembly (HDA) 100 with which the present invention is useful. The same reference numerals are used in the various figures to represent the same or similar elements. HDA 100 includes a housing with a base 102 and a top cover (not shown). HDA 100 further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in HDA 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the head's position so that it moves toward the desired position.

The servo field patterns are traditionally written onto the disc surface through the read/write head after the disc or discs have been assembled within HDA 100. In accordance with one embodiment of the present invention, one or more of the discs are at least partially formatted with servo patterns or other disc information prior to assembling the discs in HDA 100. The discs are formatted by thermally printing at least a portion of the servo patterns or other disc information onto the disc surfaces, one magnetic domain at a time. This information can include, for example, the location of each data storage sector, sector number identification information, the start of a group of sectors, servo pattern information and magnetic properties of the particular disc surface, for example.

Figure 2:
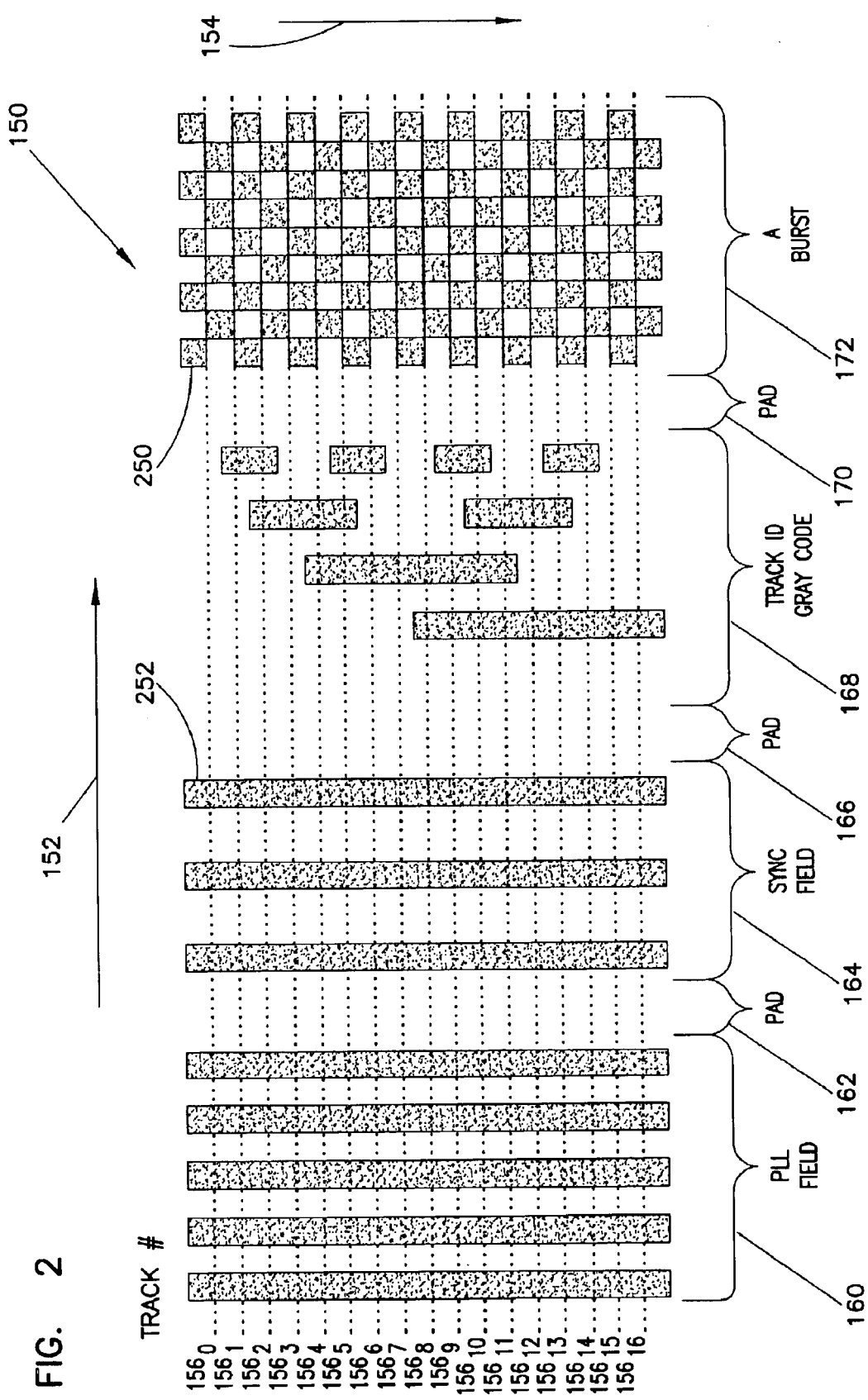
FIG. 2 is a diagram of a null-type servo magnetization pattern for a servo sector written on a disc surface in accordance with one embodiment of the present invention.

FIG. 2 is a diagram of a null-type servo magnetization pattern for a servo sector 150 written on a disc surface in accordance with one embodiment of the present invention. Arrow 152 indicates a down-track or angular dimension of the disc surface, and arrow 154 indicates a cross-track or radial dimension of the disc surface. FIG. 2 shows 17 track centers labeled $156_0$–$156_{16}$, respectively.

The shaded regions in FIG. 2 correspond to regions of opposite magnetic polarity as compared to the non-shaded regions. For example, in a longitudinal recording system, if the longitudinal magnetization in the non-shaded regions is right-to-left in figure, then the longitudinal magnetization in the shaded regions would be left-to-right. In a perpendicular recording system, the regions of opposite magnetic polarity are magnetized perpendicular to the disc surface, either into or out of the page in FIG. 2.

Servo sector 150 includes phase-locked loop (PLL) field 160, pad field 162, sync field 164, pad field 166, track ID Gray code field 168, pad field 170 and position error (PES) field 172, which is labeled "A Burst". PLL field 160 and sync field 164 contain radially coherent magnetic transitions. When the read/write head (not shown) passes over fields 160 and 164, the magnetization patterns within these fields induce an oscillating readback signal. The oscillating readback signal is used to lock the phase and frequency of the disc drive read channel to the phase and frequency of the readback signal. Track ID Gray code field 168 contains information identifying the particular track over which the head is located.

PES field 172 is used to identify the location of the head with respect to the track center line. In the embodiment shown in FIG. 2, PES field 172 contains a null-type magnetization pattern. The null-type magnetization pattern is written in a predetermined phase relation to the magnetization patterns in fields 160 and 164. As the read/write passes over PES field 172, the readback signal generated in the head is demodulated and integrated to produce a position error value. At the track center, the position error value will have zero magnitude. If the head is positioned to one side of the track center, the position error value will be positive and have a magnitude indicating the amount of displacement. If the head is displaced to the other side of the track center, the position error value will be negative and have a magnitude indicating the amount of displacement. Other types of servo patterns can also be used, such as a split burst servo pattern. Demodulation of servo patterns is discussed in more detail in U.S. patent application Ser. No. 09/268,584, filed Mar. 15, 1999 and entitled "ASYNCHRONOUS DIGITAL DEMODULATOR AND METHOD FOR A NULL-TYPE SERVO PATTERN," for example.

The smallest unit of the servo pattern is one of the small squares in PES field 172. When the head passes over a region bounded by areas of opposite magnetic polarity, a di-bit results in the readback signal. This di-bit (or cycle) is a building block of all the patterns within servo sector 150, and it consists of defined magnetic domains.

Traditionally, servo patterns are written one "servo track" at a time. The definition of a "servo track" depends on the product. As discussed above, di-bits have traditionally been written onto the disc surface by the write transducer in the read/write head. By writing these di-bits coherently track-to-track, magnetic domains of opposite polarity are written on to the disc. These magnetic domains are roughly rectangular. In one embodiment of the present invention, at least a portion of the individual magnetic domains in servo sector 150 are thermally printed onto the disc surface, one magnetic domain at a time before the disc is assembled in the drive.

Figure 3:
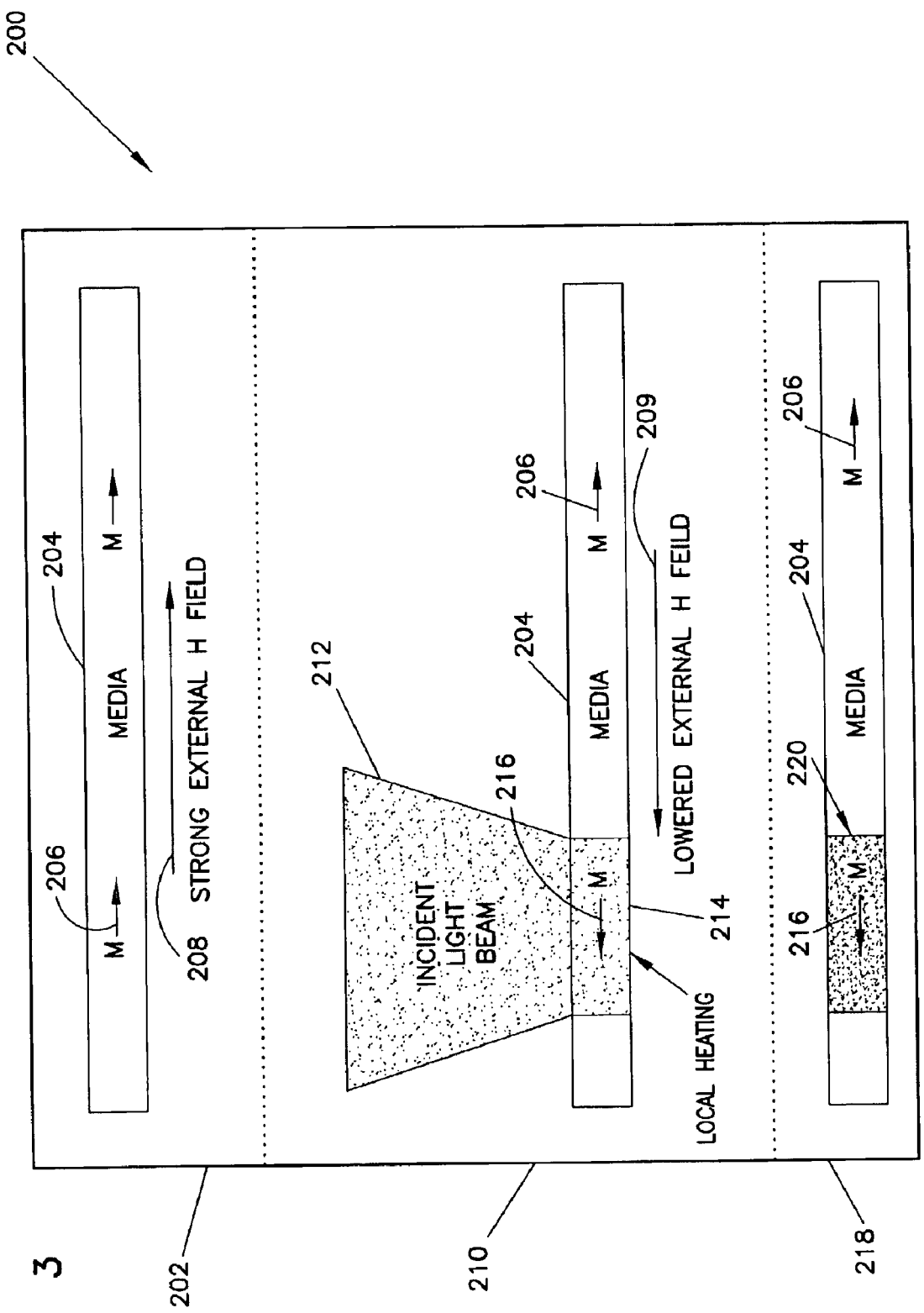
FIG. 3 is a diagram illustrating a thermal printing process according to one embodiment of the present invention.

FIG. 3 is a diagram illustrating a thermal printing process 200 according to one embodiment of the present invention. At step 202, magnetic media 204 is magnetized in a uniform magnetization direction 206 with a strong external magnetic (H) field 208. For example, in a longitudinal recording system, the entire disc is circumferentially "DC" magnetized in a uniform longitudinal direction. External magnetic field 208 has a level that is greater than the magnetic coercivity of magnetic media 204 at an ambient temperature.

At step 210, external magnetic field 208 is changed to external magnetic field 209, which has a reduced field strength and an opposite polarity as compared to field 208 in step 202. External magnetic field 209 has a field strength that is that is less than the magnetic coercivity of magnetic media 204 at the ambient temperature. An incident light beam 212 is directed to a selected area 214 on media 204 to produce local heating of media 204 within area 214. The temperature of media 204 in area 214 is elevated from the ambient temperature to an elevated temperature. The magnetic coercivity ($H_C$) of media 204 decreases with increasing temperature. When the coercivity drops below the level of externally applied magnetic field 209, the magnetization 216 in the heated area 214 will align itself with the applied field.

At step 218, light beam 212 is removed from area 214, without changing external magnetic field 209. When area 214 returns to room temperature, a thermally written magnetic domain 220 defined by the boundaries of area 214 will remain. The shape of magnetic domain 220 is determined by the shape of the illumination pattern on media 204.

Light beam 212 is then moved to another area on medium 204 to thermally write another magnetic domain. Steps 210 and 218 can be repeated as many times as necessary to produce magnetically reversed domains at different locations on medium 204 by moving the location of light beam 212. For example, steps 210 and 218 can be repeated one or more times for each of the shaded regions in PES field 172 shown in FIG. 2. In one embodiment, the light beam is pulsed on for a selected period of time at least once for each of the magnetic domains, in the presence of external magnetic field 209. Each of the magnetic domains are spatially separated from one another on the media by moving the relative positions of light beam 212 and the disc surface in the radial and circumferential directions. Information can be magnetically encoded on the disc surface in the circumferential direction, the radial direction or both.

The length of time magnetic domain 204 is exposed to the illumination pattern depends on the type of light source used and the amount of local heating required. Several types of light sources can be used. The chosen light source will depend on various factors such as the resolution desired and the need to avoid unintended changes in disc coating properties. In general, light sources having a shorter wavelength will provide better resolution. However, as the chosen wavelength becomes shorter, unintended damage to disc coatings may result. For example, while a mercury light source may provide desired resolution properties, it can increase risk of damage to the corrosion resistant carbon layer that may be applied to a disc surface. In such a case, a lower energy light source, such as a green Argon laser, may be more appropriate. In one embodiment, the light beam is incoherent. The temperature to which each magnetic domain is heated is regulated by the type of light source used, the duration of the media exposure and the power output of the light source.

The elongated shaded regions in PLL field 160, sync field 164 and track ID Gray code field 168 in FIG. 2 can be formed by scanning the light beam and the resulting illumination pattern in the radial, off-track direction 154. If the media is continuously exposed to the light beam during a radial scan, the media will cool in a heat gradient along the length of the thermally written magnetic domain. Alternatively, the light beam can be pulsed or modulated as the light beam is scanned radially across the media surface. The spacing between adjacent illumination patterns is set so that the illumination patterns at least partially overlap one another to create an elongated line of overlapping magnetic domains. For example, FIG. 4 shows an elongated magnetic domain 270 formed by overlapping individual magnetic domains 272 or by overlapping adjacent illumination patterns during a radial scan.

Figure 5:
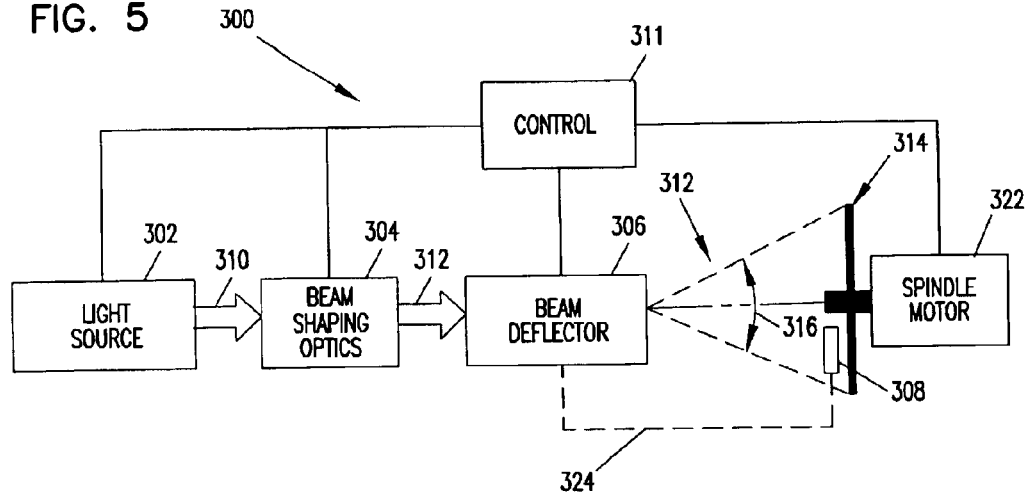
FIG. 5 is a schematic diagram of a system for thermally printing servo patterns on magnetic media, according to one embodiment of the present invention.

FIG. 5 is a schematic diagram of a system for thermally printing servo patterns on magnetic media, according to one embodiment of the present invention. System 300 includes light source 302, beam shaping optics 304, beam deflector 306, external magnetic field source 308 and control circuitry 311. Light source 302 generates light energy 310, which is passed through beam shaping optics 304 to beam deflector 306. Beam shaping optics 304 generates a light beam 312 having a desired pattern shape, which at least partially defines the shape of the magnetic field transition surrounding each thermally written magnetic domain.

Beam deflector 306 deflects beam 312 to a desired location on disc 314, within beam range 316. Beam deflector 306 can be configured to deflect light beam 312 in a radial direction across the surface of disc 314 or in an angular, circumferential direction along a desired data track on the disc, if desired. In one embodiment, beam deflector 306 includes a mirror mounted on a voice coil motor which is controlled by control circuitry 311. In another embodiment, beam deflector 306 includes an electrostatic mirror system. Other types of beam deflectors can also be used for deflecting light beam 312.

Control circuitry 311 is coupled to light source 302, beam shaping optics 304, beam deflector 306 and spindle motor 322 for controlling various aspects of their operation. Control circuitry can be configured to control the operating parameters of light source 302, such as the exposure time and intensity. Control circuitry 311 can also be coupled to beam shaping optics 304 for controlling the shape of the light beam. For example, control circuitry 311 can change the illumination pattern shape from one write operation to the next, if desired, for effecting the relative distances between adjacent transitions in magnetic polarity on the disc surface. This can be used to implement a desired data coding scheme or to simply change the size or shape of a particular magnetic domain area.

Control circuitry 311 can also be coupled to a spindle motor 322 for rotating disc 314 during servo writing operations. Disc 314 can be rotated in a continuous fashion while being exposed to light beam 312 (either continuous exposure or pulsed exposure) or can be rotated in discrete steps between individual write operations. In the latter example, disc 314 would be stationary as each magnetic domain is written.

External magnetic field source 308 can include an electromagnet or a permanent magnet, for example, which provides a magnetic field having a desired field strength at a desired orientation. The magnetic field can be limited to the area being written or can extend over all or substantially all of the disc surface. In one embodiment, the magnetic field is limited to the area being written, and magnetic field source 308 is moved with the illumination pattern under the control of beam deflector 306, as shown by dashed line 324. For perpendicular recording, magnetic field source 308 can include an electromagnetic coil having a coil axis that is perpendicular to the surface of disc 314, for example. Light beam 312 is passed through the center of the coil. For longitudinal recording, magnetic field source 308 can include one or more permanent magnets having a gap between north and south poles, which is arranged parallel to the disc surface, through the illumination pattern. Alternatively, two spaced, parallel electromagnetic coils can be arranged with a common axis oriented parallel to the disc surface. Other movable or stationary magnetic structures and configurations can also be used.

Figure 6:
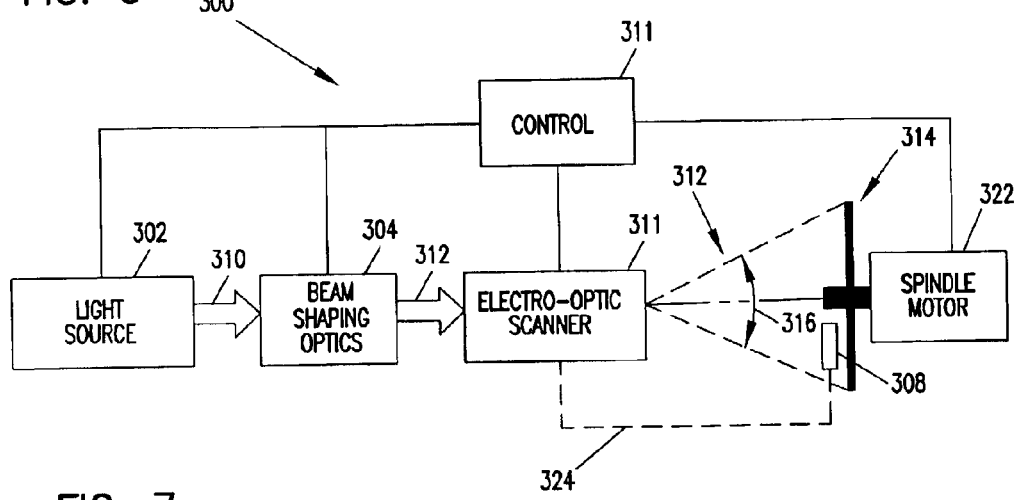
FIG. 6 is a schematic diagram of a system for thermally printing servo patterns on magnetic media, according to another embodiment of the present invention.

FIG. 6 is a schematic diagram of a system for thermally printing servo patterns on a disc surface according to an alternative embodiment of the present invention. The same reference numerals are used in FIG. 6 as were used in FIG. 5 for the same or similar elements. In FIG. 6, beam deflector 306 is replaced with an electro-optic scanner 340 for scanning light beam 312 to the correct location on the surface of disc 310. For example, electro-optic scanner 340 can include an electro-optic scanner developed by the Data Storage Systems Center at Carnegie Mellon University. Currently, electro-optic scanners are limited to deflections on the order of one degree in one dimension. Improvements in electro-optic scanner technology may enhance this deflection. As discussed above, control circuitry 311 may also rotate disc 314 to facilitate the use of a one-dimensional electro-optic scanner. An electro-optic scanner provides an advantage of a precise placement of the illumination pattern on the surface of disc 314.

Figure 7:
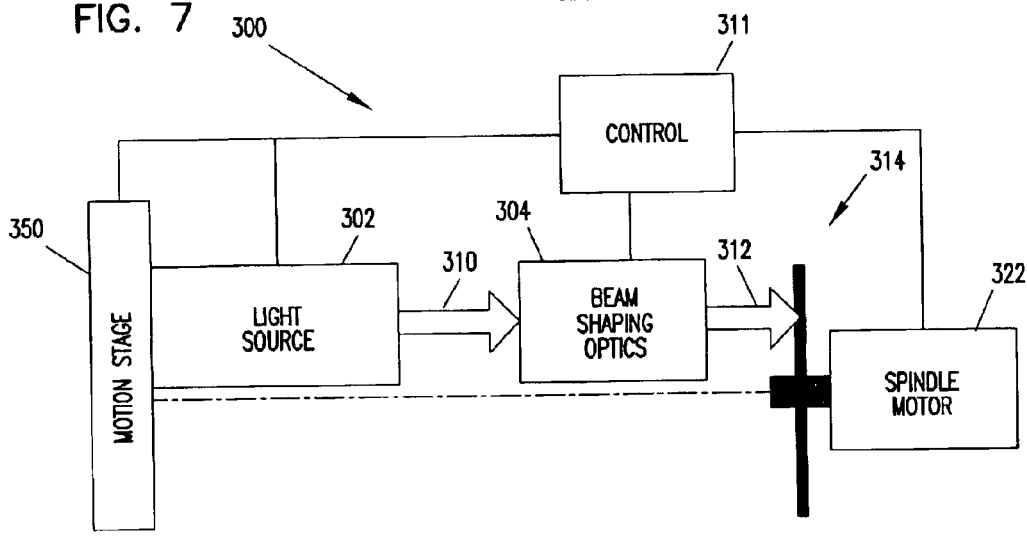
FIG. 7 is a schematic diagram of a system for thermally printing servo patterns on magnetic media, according to yet another embodiment of the present invention.

FIG. 7 is a schematic diagram of a system for thermally printing servo patterns on magnetic media according to another alternative embodiment of the present invention. The same reference numerals are used in FIG. 7 as were used in FIGS. 5 and 6 for the same or similar elements. In FIG. 7, motion stage 350 mechanically translates light source 302 and beam shaping optics 304 radially across the surface of disc 314, while spindle motor 322 rotates disc 314 to any selected circumferential location. Alternatively, motion stage 350 can be used to move spindle motor 322 and disc 314, leaving light source 302 and optics 304 stationary.

Figure 8:
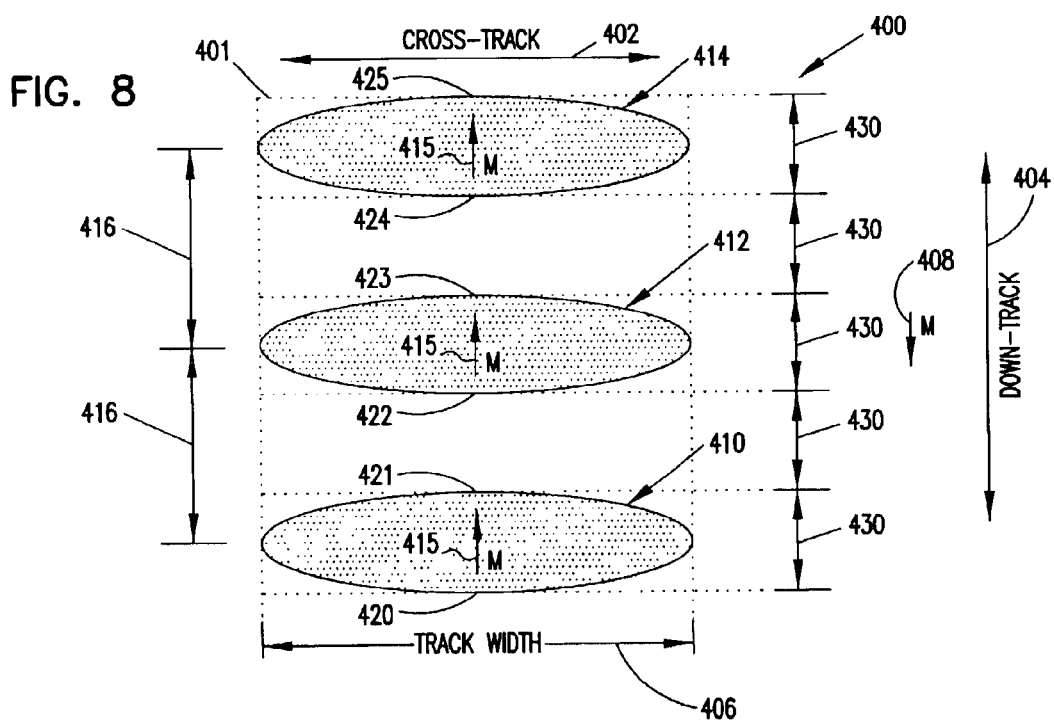
FIG. 8 is a diagram illustrating a single frequency di-bit pulse train written along a track on the disc surface in accordance with one embodiment of the present invention.

FIG. 8 is a diagram illustrating a single frequency di-bit pulse train 400 written along a track 401 on the disc surface in accordance with one embodiment of the present invention. Arrow 402 indicates a radial or cross-track direction, and arrow 404 represents a circumferential or down-track direction. Arrow 406 indicates the track width. Prior to writing pulse train 400, the disc surface was conditioned with a circumferentially uniform magnetization field such that track 401 has a background magnetization (M) in a direction indicated by arrow 408.

Pulse train 400 includes magnetic domains 410, 412 and 414, which are thermally written one domain at a time by directing an illumination pattern toward each location and heating the location in the presence of an external magnetic field having a polarity 415, which is opposite to the background magnetization direction 408. The shape of the illumination pattern determines the shape of each magnetic domain 410, 412 and 414, and in particular, the shape and position of transitions in magnetic polarity at the boundaries of each domain. In FIG. 8, the light beam used to form magnetic domains 410, 412 and 414 was elliptical.

In this example, magnetic domains 410, 412 and 414 are spaced from one another by a uniform distance or "di-bit cell spacing" 416. This distance is measured from the center of one of the magnetic domains to the center of the next subsequent magnetic domain in the pulse train, along down-track direction 404. This distance is determined by the spacing between each illumination pattern. The spacing between subsequent transitions in magnetic polarity along down-track direction 404 is measured between transition edges 420–425 and is indicated by arrows 430. Each transition generates a pulse in the readback signal.

The di-bit cell spacing 416 is equal to twice the transition-to-transition spacing 430, which creates a single frequency di-bit pulse train. This type of spacing can be used for creating the position error signal (PES) burst fields in a servo pattern, such as field 172 of FIG. 2, as well as the phase locked loop (PLL) and sync fields, such as fields 160 and 162 shown in FIG. 2. This type of spacing can also be used for creating other fields within the servo pattern.

Figure 9:
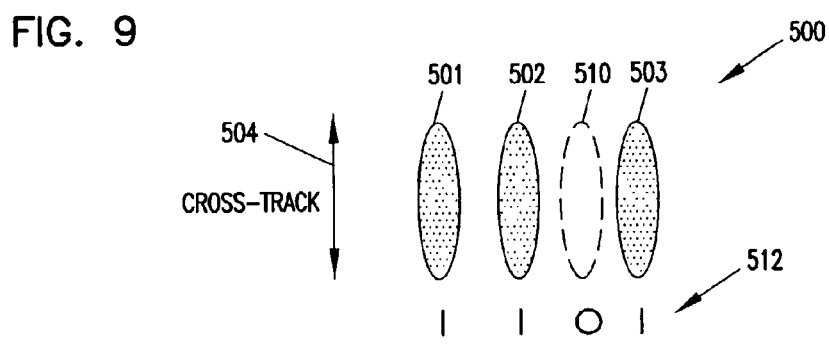
FIG. 9 is a diagram illustrating a pulse train in which illumination pattern spacing is varied within the train.

The illumination pattern size and shape and the pattern spacing can also be controlled or varied while formatting the disc to encode information onto the disc surface, such as the information in track ID field 168 in FIG. 2. Other disc information can also be encoded onto the disc surface. FIG. 9 is a diagram illustrating a pulse train 500 in which the illumination pattern spacing is varied. Pulse train 500 includes a plurality of magnetic domains 501–503, which are thermally written on to the magnetic disc by using an illumination pattern for heating each magnetic domain within the presence of an externally applied magnetic field. Arrow 504 indicates a cross-track direction, and arrow 506 indicates a down-track direction. Again, the shaded regions correspond to regions of opposite magnetic polarity as compared to the non-shaded regions.

In FIG. 9, the distances between transitions in magnetic polarity is varied by selectively varying the spacing between magnetic domains 501–503 in down-track direction 506. This spacing is controlled by controlling the spacing between each illumination pattern. The illumination pattern spacing can be used to encode information onto the disc surface. For example, the presence of a magnetic domain in a particular bit location can represent a logical "1" or "0", depending upon the convention used, and the absence of a magnetic domain in a particular bit position can represent a logical "0" or "1", respectively. The presence or absence of a magnetic domain is detected by the read/write head by detecting the presence or absence of two transitions (the left and right transitions of a particular magnetic domain in down-track direction 506) in a particular bit position. The locations of both of these transitions is solely defined by the illumination pattern shape. In FIG. 9, dashed line 510 represents the absence of a magnetic domain in the bit position between domains 502 and 503. Pulse train 500 can therefore represent an encoded binary value of "1101", as indicated by arrow 512.

Figure 10:
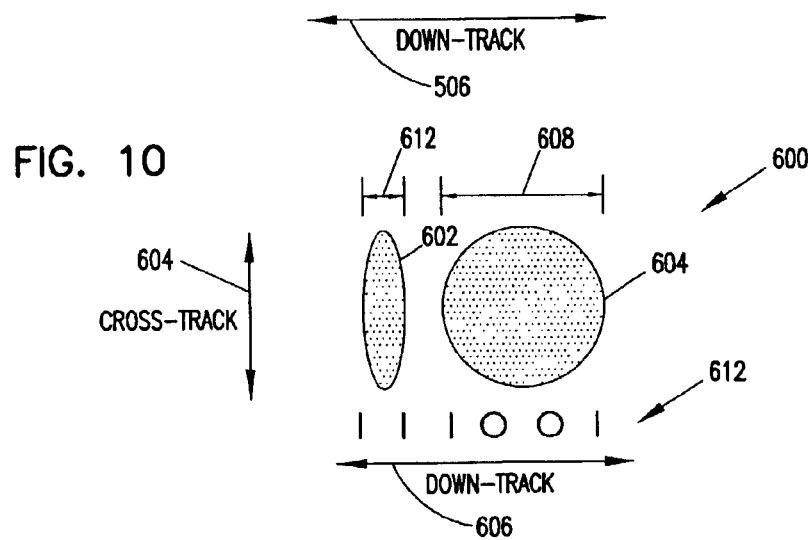
FIG. 10 is a diagram illustrating a pulse train in which the illumination pattern shape is varied within the train.

FIG. 10 is a diagram illustrating a pulse train 600 according to another embodiment of the present invention in which the illumination pattern shape is varied within the pulse train. Arrow 604 indicates a cross-track direction, and arrow 606 indicates a down-track direction. Pulse train 600 includes a plurality of magnetic domains 602–603, which are shaded to indicate that the magnetic domains have a magnetic polarity which is opposite to that of the non-shaded regions in FIG. 10. Beam shaping optics are used to vary the shape of the illumination patterns and thus the shape of the individual magnetic domains on a bit-by-bit basis. This allows the distance between transitions to be varied with the illumination pattern shape. For example, transition-to-transition spacing 608 is significantly larger than transition-to-transition spacing 610. Thus, the illumination pattern shape can be used to encode information onto the disc surface. If a logical "1" or "0" were represented by the presence or absence of a single transition at predetermined circumferential intervals, then elongating the shape of a particular magnetic domain has the effect of delaying the trailing transition of that domain in time past a particular temporal bit position. For example, in FIG. 10, if each transition represents a logical "1", then pulse train 600 represents an encoded binary "111001", as indicated by arrow 612. In the example shown in FIG. 10, encoding information by changing the illumination pattern shape significantly increases the code rate since data is represented by a single transition rather than two transitions. Increasing the code rate increases the density and speed at which information can be stored on the disc surface. The illumination pattern shape can also be controlled to avoid undesirable pulse train frequencies or bit patterns that are known to cause read errors, similar to maximum transition run (MTR) length-limited type codes.

FIG. 11 illustrates an example of a pulse train 650 having a plurality of thermally written elliptical magnetic domains 651 and 653, which have a major axis 655 aligned parallel to down-track axis 654, as opposed to cross-track axis 656 (as in FIG. 10). Magnetic domain 652 is circular. Information is encoded onto the disc surface by elongating domains 651 and 653 with respect to domain 652 by changing the illumination pattern shape from circular to elliptical. For example, pulse train 650 can represent an encoded binary "10111101", as labeled by arrow 658 beneath each magnetic transition or lack of transition along down-track axis 654.

FIG. 12 is a perspective, fragmentary view of a magnetic disc 670, which shows the formation of one of the elongated magnetic domains 651, 653 of FIG. 11. A light beam 672 is directed to the surface of disc 670 in the presence of an external magnetic field 674. In the example shown in FIG. 12, light beam 672 has an elliptical, cross-sectional shape 676 with a major axis oriented parallel to down-track direction 654. Light beam 672 therefore forms an elliptical illumination pattern 678 on the surface of disc 670, which defines the elliptical boundary shape of magnetic domain 651, 653. Beam shaping optics, such as that shown in FIGS. 5–7, can be used to form the desired illumination pattern shape. This shape can be selectively varied from at least one magnetic domain to the next along the surface of disc 672 to encode information onto the disc surface, under the control of control circuit 311 (shown in FIGS. 5–7). Magnets 680 and 682 generate magnetic field 674 adjacent the surface of magnetic disc 670, through magnetic domain 651, 653.

Thermally writing individual magnetic domains in a servo pattern through a light source and beam shaping optics is more versatile than conventional servo writing in that the shape of each magnetic domain is primarily constrained by the beam shaping optics rather than the write pole geometry of the produce head. The longer radial magnetic domains shown in FIG. 2 in PLL field 160, sync field 164 and track ID field 168 can be formed by radially overlapping individual elliptical magnetic domains or by scanning the illumination pattern in a radial direction.

Also, by overlapping at least two thermally written domains during two different writing operations, the effects of the curved transitions at the radial edges of each magnetic domain can be mitigated. For example, FIG. 13 shows a pulse train 700 having first, second and third sets 702–704 of thermally written magnetic domains 710–712, which are formed during individual writing operations and overlap one another in radial, cross-track direction 706. The combined area 713 of domains 710–712 is substantially rectangular. The resulting servo pattern formed by pulse train 700 is more regular and resembles current rectangularly-shaped servo pattern designs more closely.

In an alternative embodiment, additional writing operations can be used to overlap additional magnetic domains (not shown) in down-track direction 708. In another alternative embodiment, Fourier-type beam shaping optics can be used to generate a rectangular-shaped illumination pattern for use in the servo pattern. An example of a rectangular illumination pattern shape is shown at 214 in FIG. 3. Thus, the rectangular-shaped magnetic domains shown in FIG. 13 can each be generated with a single rectangular-shaped illumination pattern or a plurality of overlapping rectangular-shaped illumination patterns.

In some applications, it may be too time consuming to format an entire disc surface with servo patterns and other formatting information, one magnetic domain at a time. In these applications, the thermal servo track writing process of the present invention can be used to write a portion of this information onto the disc surface prior to assembling the disc within the head disc assembly. The thermally written formatting information can then be used during subsequent assembly operations or servo track writing processes through the product read/write head. For example, the thermal servo track writing process of the present invention can be used to write a radial ruler on the disc surface that can be used later by the read/write head to verify radial position during subsequent servo writing operations.

In summary, one aspect of the present invention relates to a method 200 of thermally writing a magnetic servo pattern 150, 270, 400, 500, 600, 650, 700 on a magnetic disc medium 204, 314, 670 prior to assembling the medium 204, 314, 670 in a disc drive 100. The method includes magnetizing the medium 204, 314, 670 in a uniform magnetization direction 206, 408 and then thermally writing a plurality of magnetic domains 220, 250, 252, 272, 410–414, 501–503, 602, 604, 651–653, 710–712 on the medium 204, 314, 670. The magnetic domains are written one magnetic domain at a time by individually heating each magnetic domain with a light beam 212, 312, 672 while exposing the magnetic domain to a magnetic field 209, 674. The magnetic field 209, 674 has an orientation 216, 415 that is opposite to the uniform magnetization direction 206, 408. The light beam 212, 312, 672 forms an illumination pattern 214, 678 on the medium 204, 314, 670 having a shape that at least partially defines a boundary of each magnetic domain.

Another aspect of the present invention relates to a method of thermally encoding an information pattern 612 along a track 401 of a magnetic disc medium 214, 314, 670. The method includes exposing the magnetic disc medium 214, 314, 670 to a magnetic field 209, 674 having a magnetic field strength that is less than a magnetic coercivity of the medium 204, 314, 670 at an ambient temperature and greater than the magnetic coercivity at an elevated temperature. A plurality of magnetic domains 220, 250, 252, 272, 602, 604, 651–653 are thermally written on the medium 204, 314, 670 by individually heating each magnetic domain to the elevated temperature with a light beam 213, 312, 672 while exposing the magnetic disc medium 204, 314, 670 to the magnetic field 209, 674. A cross-sectional shape 676 of the light beam 213, 314, 672 at least partially defines a boundary of each magnetic domain. The cross-sectional shape 676 of the light beam 213, 314, 672 is selectively varied from at least one of the plurality of magnetic domains 602, 651, 653 to the next 604, 652 while thermally writing the plurality of magnetic domains.

Yet another aspect of the present invention relates to a servo track writer apparatus 300 for writing a plurality of magnetic domains 220, 250, 252, 272, 410–414, 501–503, 602, 604, 651–653, 710–712, which form a servo pattern 150, 270, 400, 500, 600, 650, 700, on a rigid magnetic disc 204, 314, 670. The apparatus 300 includes a source 300, 680, 682 of a magnetic field 208, 209, 674 adjacent to the magnetic disc 204, 314, 670 and a structure 302, 304, 306, 311, 322, 340, 350 for elevating a temperature of each of the plurality of magnetic domains, one domain at a time, in the presence of the magnetic field 209, 674.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, various types of servo patterns or information can be thermally written to the disc surface in accordance with the present invention. Various types of light sources, beam deflectors or scanners, magnetic field sources can be used with the invention. Also, the particular process steps and order of steps can be modified as desired. Other modifications can also be made.

What is claimed is:

1. A method of thermally writing a magnetic servo pattern on a magnetic disc medium prior to assembling the medium in a disc drive, wherein the medium has a generally circumferential track, the method comprising:

(a) magnetizing the medium in a uniform magnetization direction;

(b) thermally writing a plurality of magnetic domains on the medium, one magnetic domain at a time, by individually heating each magnetic domain with a light beam while exposing the magnetic domain to a first magnetic field having an orientation that is opposite to the uniform magnetization direction, wherein the light beam forms an illumination pattern on the medium having a shape that at least partially defines a boundary of each magnetic domain; and (c) selectively varying the illumination pattern shape from at least one of the plurality of magnetic domains to the next within the track while writing the magnetic domains that form the servo pattern.

2. The method of claim 1 wherein step (b) comprises:

(b)(1) scanning the light beam in a generally radial direction across the surface of the medium; and (b)(2) rotating the medium relative to the illumination pattern after performing step (b)(1) and then repeating the scanning step (b)(1).

3. The method of claim 2 wherein the light beam is generated by a light source and wherein the scanning step (b)(1) comprises pulsing the light source on and off to selectively expose the medium to the light beam while scanning the light beam in the radial direction to create at least two of the magnetic domains in a radial line on the medium.

4. The method of claim 3 wherein the scanning step (b)(1) further comprises spacing the at least two magnetic domains from one another in the radial direction.

5. The method of claim 3 wherein the scanning step (b)(1) comprises overlapping the least two magnetic domains in the radial direction on the magnetic disc medium such that the combined area of the at least two magnetic domains is elongated in the radial direction and substantially rectangular.

6. The method of claim 2 wherein the scanning step (b)(1) comprises exposing the medium to the illumination pattern continuously while scanning the illumination pattern in the radial direction to form at least one of the plurality of magnetic domains with an elongated dimension in the radial direction.

7. The method of claim 1 wherein the thermally writing step (b) comprises:

generating the light beam with a light source, wherein the light beam has a light beam path from the light source to the medium; and changing the light beam path to move the illumination pattern from one of the magnetic domains to the next on the medium.

8. The method of claim 1 wherein the thermally writing step (b) comprises:

deflecting the light beam with a light beam deflector to move the illumination pattern from one of the magnetic domains to the next.

9. The method of claim 1 wherein the track has a longitudinal, down-track direction and wherein step (c) comprises:

selectively varying a width of the light beam in the longitudinal, down-track direction.

10. The method of claim 1 wherein step (b) comprises:

(b)(1) defining the boundary of each magnetic domain entirely and solely with the illumination pattern shape.

11. The method of claim 1 wherein step (c) comprises:

encoding information onto the medium by changing the illumination pattern shape from at least one of the magnetic domains to the next subsequently written magnetic domain within the track.

12. The method of claim 1 wherein step (c) comprises:

encoding information onto the medium by changing spacing along the medium between selected ones of the plurality of magnetic domains within the track, during step (b).

13. The method of claim 1 wherein:

step (a) comprises exposing the magnetic disc medium to a second magnetic field, which has a magnetic field strength that is greater than a magnetic coercivity of the medium at an ambient temperature; and step (b) comprises:

(b)(1) exposing each of the magnetic domains to the magnetic field, which has a magnetic field strength that is less than the magnetic coercivity of the medium at the ambient temperature and greater than the magnetic coercivity at an elevated temperature;

(b)(2) heating each of the magnetic domains to the elevated temperature with the light beam while exposing each of the magnetic domains to the first magnetic field; and (b)(3) cooling each of the magnetic domains from the elevated temperature to the ambient temperature while exposing each of the magnetic domains to the first magnetic field.

14. The method of claim 1 wherein step (b) comprises:

(b)(1) shaping the light beam such that the illumination pattern shape and the boundaries of the plurality of magnetic domains are substantially square.

15. The method of claim 1 wherein step (b) comprises:

(b)(1) overlapping at least two of the plurality of domains in a radial direction on the magnetic disc medium such that the combined area of the at least two domains is substantially rectangular.

16. A method of thermally encoding an information pattern along a track of a magnetic disc medium, the method comprising:

(a) exposing the magnetic disc medium to a magnetic field having a magnetic field strength that is less than a magnetic coercivity of the medium at an ambient temperature and greater than the magnetic coercivity at an elevated temperature;

(b) thermally writing a plurality of magnetic domains on the medium by individually heating each magnetic domain to the elevated temperature with a light beam while exposing the magnetic disc medium to the magnetic field, wherein a cross-sectional shape of the light beam at least partially defines a boundary of each magnetic domain; and (c) selectively varying the cross-sectional shape of the light beam from at least one of the plurality of magnetic domains to the next while thermally writing the plurality of magnetic domains within the track.

17. The method of claim 16 wherein the track has a longitudinal, down-track direction and step (c) comprises:

(c)(1) selectively varying a width of the light beam in the longitudinal, down-track direction.

18. The method of claim 16 wherein the light beam forms an illumination pattern shape on the magnetic disc medium and wherein step (b) comprises:

(b)(1) defining the boundary of each magnetic domain entirely with the illumination pattern shape.

19. A method of thermally encoding an information pattern along a track of a magnetic medium, the method comprising:

(a) magnetizing the medium in a uniform magnetization direction; and (b) thermally writing a plurality of magnetic domains within the track, one magnetic domain at a time, by individually heating each magnetic domain with a light beam while exposing the magnetic domain to a first magnetic field having an orientation that is opposite to the uniform magnetization direction, wherein the light beam forms an illumination pattern on the medium having a shape that at least partially defines a boundary of each magnetic domain and is substantially square.

* * * * *